April 10, 1945     A. V. NICOLLE     2,373,493
PISTON
Filed Nov. 17, 1942
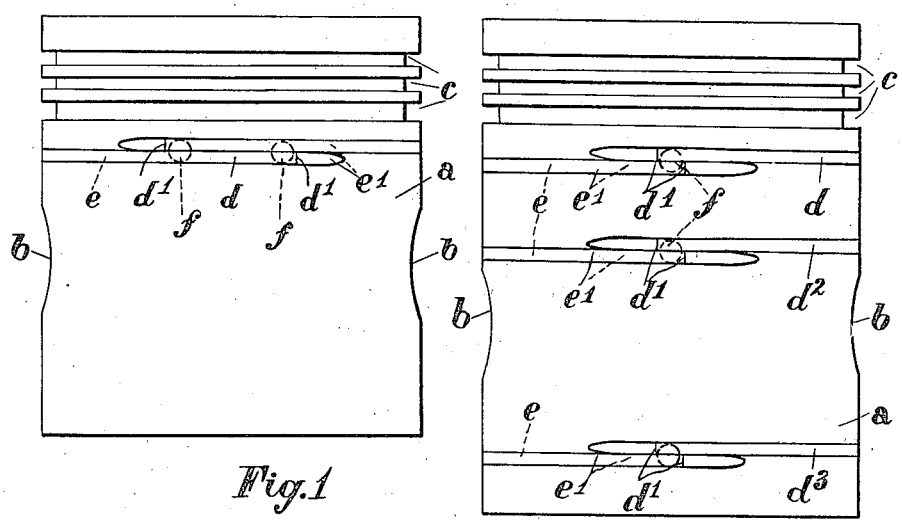
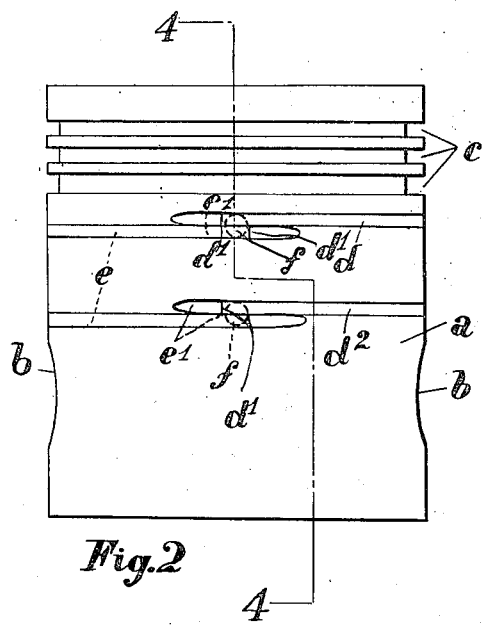
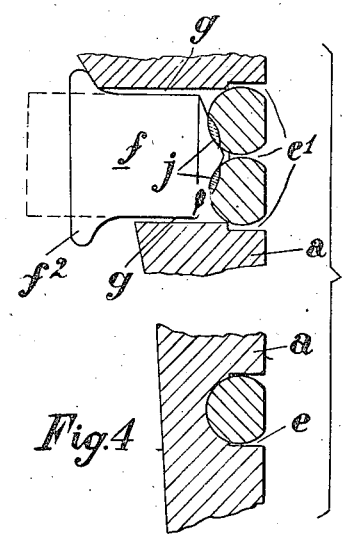
Inventor
A. V. Nicolle Patented Apr. 10, 1945

2,373,493

UNITED STATES PATENT OFFICE 2,373,493

PISTON

Arthur Villeneuve Nicolle, Twickenham, England, assignor to The Automotive Engineering Company Limited, Twickenham, England Application November 17, 1942, Serial No. 465,891
In Great Britain September 22, 1941

3 Claims. (Cl. 309—13)

This invention relates to light metal pistons, primarily for internal combustion engines, and has for its object to provide a light metal piston which is free from the expansion difficulties so well known thereof.

According to the invention a light metal piston is provided primarily for internal combustion engines comprising a piston body having an external circumferential groove in the form of a single helical turn and a helical turn of wire laid in said groove so that the ends thereof overlap each other in said groove, the said wire having a coefficient of expansion less than that of the metal of the piston body and being of a thickness or gauge sufficient to enable the wire to control the radial expansion of the piston and the ends of the wire being anchored to the piston body so as to be immovable relatively thereto in the direction of the longitudinal axis of the piston and be in a relatively unstressed condition at normal atmospheric temperature.

In the accompanying drawing—

Figure 1 is an elevational view of one piston construction according to the invention having a single wire turn, Figure 2 is an elevational view of a piston showing a modified arrangement of the invention employing two wire turns, Figure 3 is an elevational view of the piston showing yet another modified view of the invention employing three wire turns, and Figure 4 is a fragmentary sectional view on the line 4—4 of Figure 2 showing the wire turns of Figure 2 and their means of attachment on an enlarged scale.

In carrying the invention into effect as illustrated in the drawing, the piston $a$, as shown in Figure 1, is provided above the gudgeon pin bosses but below the piston ring grooves $c$ with a single turn of thin strip material or wire $d$ which is accommodated in a helical groove $e$, and has its ends $d^1$ each anchored to a separate insert $f$ in the piston wall, so that the single turn of stout wire is held upon the piston in an unstressed condition. The gudgeon pin bosses are located in those portions of the piston indicated at $b$.

In the construction according to Figure 2, the piston is fitted with two single turns $d$, $d^2$ of thin strip material or wire and disposed in axially spaced relationship between the piston ring grooves and the gudgeon pin bosses. In this case the end portions of each turn of wire or the like are anchored to a common insert element $f$ in the piston wall.

In the construction according to Figure 3, the piston is fitted with two single turns $d$, $d^2$, of wire or the like above the gudgeon pin bosses, and with a third turn $d^3$ beneath the latter, the end portions of each turn being anchored to a common insert $f$.

Figure 4 illustrates one mode of anchoring the wire or like ends so that the turns thereof are held firmly upon the piston in an unstressed condition. To this end, where the ends of the turns of wire overlap each other and where the ends of the helical groove consequently form a portion $e^1$ thereof of double axial depth, a hole $g$ is pierced through the piston wall and a cylindrical pin $f$ is inserted therein and then spot welded, as indicated at $j$, so as not only to anchor it to the wire end as well as the overlapping part of wire turn, but also to form, by upsetting, a head $f^2$ on the end of the insert remote from the wires. One insert may thus anchor both ends of the wire, as shown in Figures 2 and 3; or alternatively two separate inserts may be used, each anchoring one end of the wire as shown in Figure 1. In Figure 4 the original form of the insert pin is shown in dotted lines and the final form thereof in which the head $f^2$ is formed is shown in full lines.

The location of the wire turn or turns in a groove in the piston wall prevents axial displacement of the wire, such as would tend to occur during reciprocation of the piston in its cylinder.

Where the expression "wire" is employed in the description and claims of this specification, this is intended to cover flexible metallic strip material of circular or other suitable cross-section or shape.

The thickness or gauge of the wire employed will, of course, vary according to specific requirements but as an example it may be stated that for an aluminium alloy piston of 70 m./m. diameter a single turn of 11 SWG steel wire satisfactorily controls expansion of the piston.

I claim:

1. A light metal piston primarily for internal combustion engines comprising a piston body having an external circumferential groove in the form of a single helical turn, a single helical turn of wire laid in said groove and a circumferentially spaced pair of insert members in the piston body to each of which one end of the helical wire turn is anchored so that the wire is substantially unstressed at atmospheric temperature, the wire having a lower coefficient of expansion than the piston body and serving to control the radial expansion of the latter.

2. A light metal piston as claimed in claim 1 wherein the ends of the helical groove are contained in a common groove portion of double the depth, in the direction of the longitudinal axis of the piston body, of the remainder of the groove, and the wire ends are welded to a pair of individual insert plugs extending radially through the said common groove portion and circumferentially spaced therein.

3. A light metal piston primarily for internal combustion engines comprising a piston body having an external circumferential groove therein in the form of a single helical turn, the ends of which are contained in a common groove portion of double the depth, in the direction of the longitudinal axis of the piston body, of the remainder of the groove, a single helical turn of wire laid in said helical groove so that the ends of the wire overlap one another in said common groove portion and a common insert member in the piston body to which both ends of the wire are anchored, the wire being formed from a metal of less coefficient of expansion than that of the metal of the piston body and the thickness or gauge of the wire being sufficient to enable the wire to control the radial expansion of the piston body.

ARTHUR VILLENEUVE NICOLLE.